(12) United States Patent
Dong

(10) Patent No.: US 12,185,281 B2
(45) Date of Patent: Dec. 31, 2024

(54) METHOD AND DEVICE FOR ALLOCATING COMMUNICATION RESOURCE, AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 375 days.

(21) Appl. No.: 17/634,542

(22) PCT Filed: Aug. 23, 2019

(86) PCT No.: PCT/CN2019/102294
§ 371 (c)(1),
(2) Date: Feb. 10, 2022

(87) PCT Pub. No.: WO2021/035406
PCT Pub. Date: Mar. 4, 2021

(65) Prior Publication Data
US 2022/0287007 A1  Sep. 8, 2022

(51) Int. Cl.
*H04W 72/02* (2009.01)
*H04W 72/0446* (2023.01)
*H04W 72/0453* (2023.01)

(52) U.S. Cl.
CPC ....... *H04W 72/02* (2013.01); *H04W 72/0446* (2013.01); *H04W 72/0453* (2013.01)

(58) Field of Classification Search
CPC ............. H04W 72/02; H04W 72/0446; H04W 72/0453

USPC ......................................................... 370/329
See application file for complete search history.

(56) References Cited

U.S. PATENT DOCUMENTS

| 2007/0058595 A1* | 3/2007 | Classon ................... H04L 1/188 709/236 |
| 2008/0310528 A1* | 12/2008 | Soong ................... H04L 5/0007 375/260 |
| 2010/0182968 A1 | 7/2010 | Ojala et al. |
| 2011/0142002 A1 | 6/2011 | Chapman |

(Continued)

FOREIGN PATENT DOCUMENTS

| CA | 2565383 C | 12/2011 |
| CN | 105828452 A | 8/2016 |

(Continued)

OTHER PUBLICATIONS

Office Action of Indian Application No. 202247014875, dated Aug. 23, 2022 with partial English translation, (6p).

(Continued)

Primary Examiner — Mark G. Pannell
(74) Attorney, Agent, or Firm — Arch & Lake LLP

(57) ABSTRACT

A method for allocating a communication resource is provided. The method includes: generating a communication-resource-allocation message frame in a set channel bandwidth, where the communication-resource-allocation message frame includes a communication-resource-allocation information bit, and the communication-resource-allocation information bit identifies at least one resource unit allocated to a station; and transmitting the communication-resource-allocation message frame.

15 Claims, 4 Drawing Sheets generating a communication-resource-allocation message frame in a set channel bandwidth, in which a communication-resource-allocation information bit is set in the communication-resource-allocation message frame, and at least one RU allocated to the STA is identified by the communication-resource-allocation information bit  — S31 transmitting the communication-resource-allocation message frame  — S32

(56) References Cited

U.S. PATENT DOCUMENTS

| | | | | |
|---|---|---|---|---|
| 2011/0195733 | A1* | 8/2011 | Zheng | H04L 5/0094 455/509 |
| 2012/0263132 | A1* | 10/2012 | Guan | H04L 5/0094 370/329 |
| 2016/0286551 | A1* | 9/2016 | Lee | H04L 25/0226 |
| 2016/0330300 | A1* | 11/2016 | Josiam | H04L 65/40 |
| 2017/0339673 | A1* | 11/2017 | Choi | H04W 84/12 |
| 2018/0063821 | A1 | 3/2018 | Huang et al. | |
| 2018/0184429 | A1* | 6/2018 | Gan | H04W 72/12 |
| 2020/0187237 | A1* | 6/2020 | Su | H04W 72/0453 |

FOREIGN PATENT DOCUMENTS

| | | | |
|---|---|---|---|
| CN | 105848298 | A | 8/2016 |
| CN | 105898798 | A | 8/2016 |
| CN | 107534502 | A | 1/2018 |
| CN | 107580375 | A | 1/2018 |
| JP | 2018526840 | A | 9/2018 |
| KR | 20170140364 | A | 12/2017 |
| KR | 20180018745 | A | 2/2018 |
| KR | 20180026367 | A | 3/2018 |

OTHER PUBLICATIONS

The First CNOA of Application No. 201980001744.6 dated on Aug. 1, 2022 with English translation, (12p).
The Extended European Search Report issued in Application No. 19943417.6, dated on Feb. 28, 2023, (14p).
Jianhan Liu (Mediatek), "Enhanced Resource Allocation Schemes for 11be", doc.: IEEE 802.11-19/1126r0, dated Jun. 12, 2019, (7p).
L e i Huang et al., (PANASONIC) : "Enabling persistent allocation for EHT", doc.: IEEE 802.11-19/0806r2, dated Jul. 31, 2019, (8p).
JPOA of Application No. 2022-511380 dated on Mar. 22, 2023 with English translation,(10p).
International Search Report of PCT Application No. PCT/CN2019/102294 dated May 27, 2020 with English translation, (4p).
The KROA issued in Application No. 10-20227009335 dated Sep. 27, 2024 with English Translation, (11p).

* cited by examiner

| RU Type | 20MHz | 40MHz | 80MHz | 80+80/160MHz |
|---|---|---|---|---|
| 26-tone RU | 9 | 18 | 37 | 74 |
| 52-tone RU | 4 | 8 | 16 | 32 |
| 106-tone RU | 2 | 4 | 8 | 16 |
| 242-tone RU | 1 | 2 | 4 | 8 |
| 484-tone RU | N/A | 1 | 2 | 4 |
| 996-tone RU | N/A | N/A | 1 | 2 |
| 2× 996-tone RU | N/A | N/A | N/A | 1 |
FIG. 1
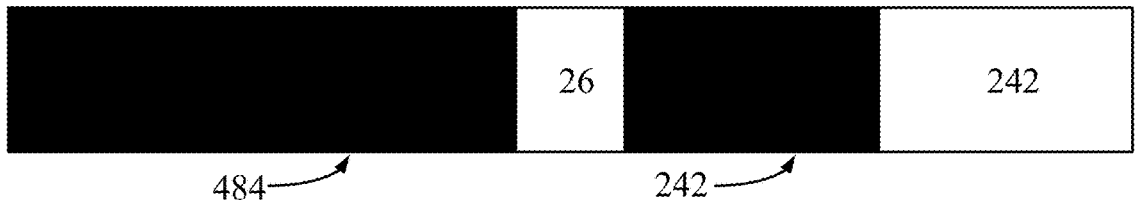
FIG. 2
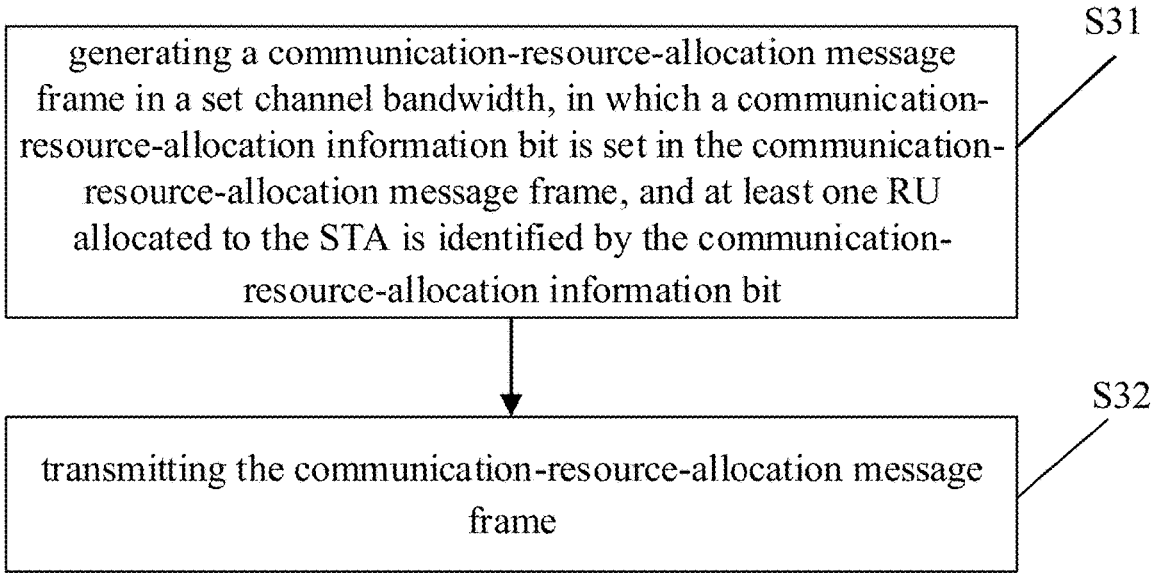
FIG. 3

| B0 | B11 B12 | B19 | B20 B21 | B24 | B25 | B26 | B31 B32 | B38 | B39 |
|---|---|---|---|---|---|---|---|---|---|
| association identifier (AID12) | RU Allocation | uplink forward-error-correcting coding type (UL FEC coding Type) | uplink modulation coding scheme (UL MCS) | uplink dual carrier modulation (UL DCM) | spatial stream allocation/ random access-RU allocation | uplink target received signal strength indicator (UL target RSSI) | Reserved | trigger dependent user info |

FIG. 4

| B0 | B3 | B4 | B15 | B16 | B17 | B18 | B19 | B20 | B21 | B22 | B23 | B25 |
|---|---|---|---|---|---|---|---|---|---|---|---|---|
| trigger type | | uplink length (UL length) | | more trigger frames (More TF) | channel sensing required (CS required) | | uplink bandwidth (UL BW) | | guard interval and long training field type (GI and LTF type) | multi-user multiple-input multiple-output mode (MU-MIMO LTF Mode) | | number of high efficiency (HE)-LTF symbols and midamble periodicity |

| B26 | B27 | B28 | B33 | B34 | B35 | B36 | B37 | B52 | B53 | B54 | B62 |
|---|---|---|---|---|---|---|---|---|---|---|---|
| uplink space time block coding (UL STBC) | low density parity check code (LDPC) extra symbol segment | AP transmit power (AP TX power) | | Pre-FEC padding factor | | PE disambiguity | UL spatial reuse | | Doppler | UL HE-SIG A2 reserved | |

| B63 |
|---|
| reserved |

| trigger dependent common info |
|---|

FIG. 5

METHOD AND DEVICE FOR ALLOCATING COMMUNICATION RESOURCE, AND STORAGE MEDIUM

CROSS-REFERENCE TO RELATED APPLICATION

This application is the national phase application of International Application No. PCT/CN2019/102294, filed on Aug. 23, 2019, the entire content of which is incorporated herein by reference for all purposes.

TECHNICAL FIELD

The disclosure relates to the field of communication technologies, and more particularly, to a method and a device for allocating a resource, and a storage medium.

BACKGROUND

IEEE802.11 established study group (SG) IEEE802.11be to study the next-generation mainstream (IEEE802.11a/b/g/n/ac/ax) wireless fidelity (Wi-Fi) technology, to improve an access rate and throughput of the Wi-Fi technology and the like wireless local area network (WLAN) technologies.

In the next-generation mainstream (IEEE802.11a/b/g/n/ac/ax) Wi-Fi technology, a mechanism of allocating by an access point (AP) a resource for a station (STA) is still used to realize an association between the STA and the AP.

SUMMARY

According to a first aspect of embodiments of the disclosure, a method for allocating a communication resource is provided. The method includes: generating a communication-resource-allocation message frame in a set channel bandwidth, the communication-resource-allocation message frame including a communication-resource-allocation information bit, the communication-resource-allocation information bit for identifying at least one resource unit (RU) allocated to a station (STA); and transmitting the communication-resource-allocation message frame.

According to a second aspect of embodiments of the disclosure, a device for allocating a communication resource is provided. The device includes: a processor; and a memory for storing instructions executable by the processor; in which the processor is configured to perform the method for allocating the communication resource described in the first aspect.

According to a third aspect of embodiments of the disclosure, a non-transitory computer-readable storage medium is provided. When instructions in the storage medium are executed by a processor of an access point (AP), the AP is caused to perform the method for allocating the communication resource described in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 1 is a schematic diagram illustrating a maximum number of RUs allocated for different RU types in each bandwidth, according to an embodiment.

FIG. 2 is a schematic diagram illustrating a communication resource allocation, according to an embodiment.

FIG. 3 is a flow chart illustrating a method for allocating a communication resource, according to an embodiment.

FIG. 4 is a schematic diagram illustrating a format of a communication-resource-allocation message frame, according to an embodiment.

FIG. 5 is a schematic diagram illustrating a format of a communication-resource-allocation message frame, according to an embodiment.

DETAILED DESCRIPTION

Figure 6:
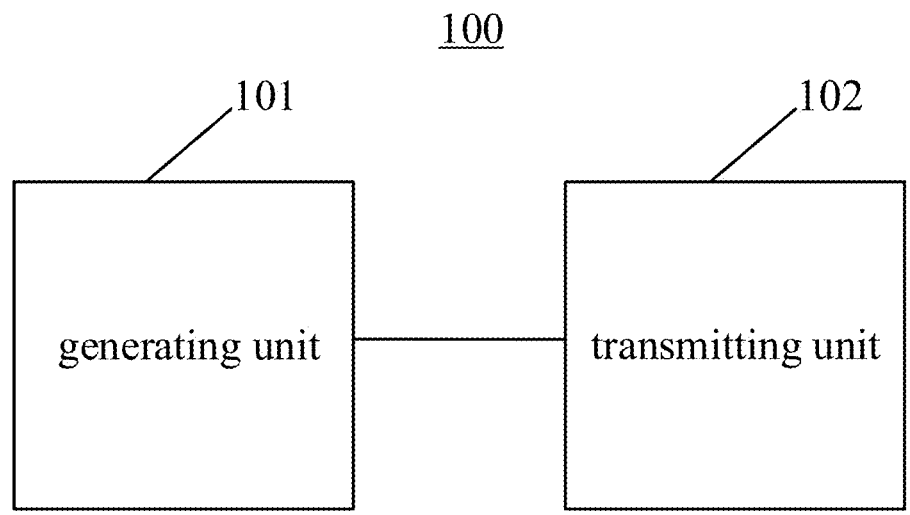
FIG. 6 is a block diagram illustrating an apparatus for allocating a communication resource, according to an embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

A method for allocating a communication resource, provided in the disclosure, is applicable to a wireless local area network (WLAN) communication system including at least one STA and an AP. The STA transmits information and initiates a process of associating with the AP, through the communication resource allocated by the AP.

The STA in the disclosure may be understood as a user terminal in the WLAN. The user terminal may be referred to as a user equipment (UE), a mobile station (MS), a mobile terminal or the like. The user terminal may be a device that provides speech and/or data connectivity for a user. For example, the terminal may be a handheld device, a vehicle-mounted device or the like, with a wireless connection function. At present, some examples of terminals are: smart phones (mobile phones), pocket personal computers (PPCs), handheld computers, personal digital assistants (PDAs), notebook computers, tablet computers, wearable devices, Internet of Things (IoT) clients, in-vehicle devices or the like. In the disclosure, AP refers to an equipment, a routers or the like that the user terminal of the WLAN accesses the network.

In the related art, the IEEE 802.11 standard is used to allocate a resource for the STA. For example, in IEEE802.11ax, a media access control (MAC) mechanism is used to allocate a RU to the STA in a certain bandwidth. FIG. 1 is a schematic diagram illustrating a maximum number of RUs allocated for different RU types (26-tone RU, 52-tone RU, 106-tone RU, 242-tone RU, 484-tone RU, 996-tone RU, 2*996 tone RU) in each bandwidth (20 MHz, 40 MHz, 80 MHZ, 80+80/160 MHz) in IEEE802.11ax. However, when allocating the resource, one RU is allocated to each STA in the certain bandwidth at one time. Only one RU is allocated to each STA and there are bound to be many unusable resources, resulting in waste of resources and low resource utilization.

For example, in FIG. 2, in a bandwidth of 80 MHz, there are only two users. If one user is allocated with a 242-tone RU marked in slashed area, another user may be only allocated with a 484-tone RU marked in slashed area at most, while a 242-tone RU and a 26-tone RU marked in white are not used. This leads to a decrease of more than a quarter of the spectrum utilization.

At present, IEEE802.11 established SG IEEE802.11be to study the next-generation mainstream (802.11a/b/g/n/ac/ax) Wi-Fi technology. The research scope is: 320 MHz bandwidth transmission, aggregation and coordination of multiple frequency bands and the like. The proposed prospect is to increase the rate and throughput by at least four times compared with the existing 802.11ax. Its scenarios are video transmission, augmented reality (AR), virtual reality (VR), etc.

The aggregation and coordination of multiple frequency bands refers to simultaneous communication among devices in 2.4 GHz, 5.8 GHz and 6-7 GHz frequency bands. For the simultaneous communication among devices in multiple frequency bands, a new MAC communication-resource-allocation mechanism needs to be defined for management.

In view of this, the disclosure provides a method for allocating a communication resource. In the method for allocating the communication resource, multiple (at least one) RUs are allocated to each STA, so as to allocate sufficient communication resources for the STA and improve the spectrum utilization.

FIG. 3 is a flow chart illustrating a method for allocating a communication resource, according to an embodiment. As illustrated in FIG. 3, the method for allocating the communication resource includes the following.

In S11, a communication-resource-allocation message frame is generated in a set channel bandwidth.

In the disclosure, the communication-resource-allocation message frame may be generated based on the channel bandwidth. For example, the corresponding communication-resource-allocation message frame is generated for the channel bandwidth such as 20 MHz, 40 MHz, 80 MHZ, 80+80/160 MHz or 160+160/320 MHz. A communication-resource-allocation information bit is set in the communication-resource-allocation message frame, and at least one RU allocated to the STA is identified by the communication-resource-allocation information bit.

In S12, the communication-resource-allocation message frame is transmitted.

In the disclosure, by generating the communication-resource-allocation message frame for identifying the at least one RU allocated to the STA in the set channel bandwidth, and transmitting the communication-resource-allocation message frame, to allocate multiple (at least one) RUs to the STA. The sufficient communication resources are allocated to the STA to improve the spectrum utilization.

In the following, the disclosure may describe the communication-resource-allocation message frame and the process of using the communication-resource-allocation message frame to allocate communication resources to the STA in combination with applications.

In an implementation manner, the disclosure identifies an RU type and a number of RUs allocated to the STA by the communication-resource-allocation information bit set in the communication-resource-allocation message frame, so as to identify the allocated RU(s).

In the disclosure, the RU type and the number of RUs may be coded separately, to characterize different RU types and numbers of RUs through the coded values.

For example, in the disclosure, a first bit for indicating the RU type and a second bit for indicating the number of RUs are set respectively.

In an example, a number of bits of the first bit is determined based on a total number of RU types, and different bit values of the first bit are configured to indicate different RU types. For example, when the channel bandwidth is 320 MHz, the RU types include 26-tone RU, 52-tone RU, 106-tone RU, 242-tone RU, 484-tone RU, 996-tone RU, 1992-tone RU and 3984-tone RU, which are 8 types. Therefore, different RU types may be identified by different bit values of at least 3 bits. For example, "000" identifies "26-tone RU", "001" identifies "52-tone RU", "010" identifies "106-tone RU", "011" identifies "242-tone RU", "100" identifies "448-tone RU", "101" identifies "996-tone RU", "110" identifies "1992-tone RU" and "111" identifies "3984-tone RU".

In the disclosure, the RU allocation situation in each channel bandwidth and a sum number of RUs capable to be allocated for each RU type (i.e., a sum of maximum numbers of RUs capable to be allocated in different channel bandwidths) may be determined based on a maximum number of RUs capable to be allocated in each channel bandwidth (see FIG. 1).

For example, when the channel bandwidth is 20 MHz, the RU allocation situation is: 9*26-tone, 4*52-tone, 2*106-tone and 1*242-tone, and when the channel bandwidth is 160 MHz, the RU allocation situation is: 76*26-tone, 32*52-tone, 16*106-tone, 8*242-tone, 4*448-tone, 2*996-tone and 1*2*996-tone. Since 320 MHz bandwidth is supported in IEEE802.11be, the classification of RUs should be twice that of 160 MHz, specifically: 76*2*26-tone, 32*2*52-tone, 16*2*106-tone, 8*2*242-tone, 4*2*448-tone, 2*2*996-tone, 2*2*996-tone and 1*2*1992-tone.

For example, taking 20 MHz bandwidth as the counting point, 40 MHz, 80 MHz, 80+80/160 MHz and 160+160/320 MHz may be presented, and the total number of RUs capable to be allocated for each RU type is:

```
26-tone RU: 9 + 18 + 37 + 74 + 148
52-tone RU: 4 + 8 + 16 + 32 + 64
106-tone RU: 2 + 4 + 8 + 16 + 32
242-tone RU: 1 + 2 + 4 + 8 + 16
448-tone RU: na + 1 + 2 + 4 + 8
996-tone RU: na + na + 1 + 2 + 4
1992-tone RU: na + na + na + 1 + 2
3984-tone RU: na + na + na + na + 1
```

Since the total number of RUs capable to be allocated for each RU type is a fixed value, the number of RUs capable to be allocated for each RU type in the disclosure may be numbered in an order of 20 MHz, 40 MHz, 80 MHz, 80+80/160 MHz and 160+160/320 MHz. The serial numbers may represent the channel bandwidth and the corresponding number of allocated RUs. For example, the total number of RUs capable to be allocated for 26-tone RU is: 9+18+37+74+148=286. The number of RUs capable to be allocated for each RU type is numbered based on the order of 20 MHz, 40 MHz, 80 MHz, 80+80/160 MHz and 160+160/320 MHz as 1, 2, 3, 4 . . . 286. The specific values in serial numbers 1-9 represent the number of allocated RUs and represent the 20 MHz channel bandwidth. The specific values in serial numbers 10-27 represents the number of allocated RUs and represents the 40 MHz channel bandwidth. Similarly, other serial numbers represent the corresponding channel bandwidth and the corresponding number of allocated RUs. It may be understood that the numbering of the number of RUs in the disclosure also represents the coding of RU positions. For example, after the 26-tone RU is number-coded, there are 9 RUs in the 20 MHz channel bandwidth. The numerical numbers from left to right are 1-9, and the position numbers are also 1-9. In the 40 MHz channel bandwidth, 18 RUs are numbered as 10-27 from left to right, and the position numbers are also 10-27.

In an example, in the disclosure, a number of bits of the second bit is determined based on the RU type and the maximum number of RUs capable to be allocated in each channel bandwidth. In other words, the number of bits for indicating the number of RUs is able to characterize a sum of the maximum number of allocated RUs for the RU type in each channel bandwidth. In the disclosure, the RU type is indicated by the number of bits of the second bit, and the channel bandwidth and the number of resource units allocated in the channel bandwidth for the RU type indicated by the number of bits of the second bit, may be indicated by the bit value of the second bit. For example, when the RU type is 26-tone RU, the total number of RUs capable to be allocated is: 9+18+37+74+148=286 based on the maximum number of RUs capable to be allocated in each channel bandwidth shown in FIG. 1, so that at least 9 bits are used to indicate that the RU type is: 26-tone RU. The different bit values of 9 bits may characterize the serial numbers after numbering the number of RUs capable to be allocated for each RU type in the order of 20 MHz, 40 MHz, 80 MHz, 80+80/160 MHz and 160+160/320 MHz, and further represents the channel bandwidth and the number of RUs capable to be allocated for the RU type indicated by the number of bits of the second bit in the channel bandwidth.

In summary, in the disclosure, the first bit and the second bit may be used to form the communication-resource-allocation information bit, and identify the RU type and the number of RUs allocated to the STA. The number of bits of the communication-resource-allocation information bit is at least:

26-tone RU: 12 bits
52-tone RU: 11 bits
106-tone RU: 9 bits
242-tone RU: 8 bits
448-tone RU: 7 bits
996-tone RU: 6 bits
1992-tone RU: NA
3984-tone RU: NA For example, taking 26-tone RU as an example, for the 20 MHz channel bandwidth, at least 12 bits may be used for the communication-resource-allocation information bit to identify the RU type and RU position for multiple allocation. The first three bits identify the RU type and the last 9 bit identify the number of RUs.

In an example, in the disclosure, for specifying the STA allocated for RUs, an STA identifier may be set in the communication-resource-allocation message frame. The STA identifier has a one-to-one correspondence with the RU. The STA identifier may be configured to clearly specify the STA allocated for RUs and RUs allocated for the STA.

Further, the communication-resource-allocation message frame mentioned above in the disclosure may be obtained by modifying a format of a trigger frame (TF-R) in IEEE802.11ax. For example, in the disclosure, the communication-resource-allocation information bit may be obtained by adding bit(s) to "RU allocation" in the TF-R in FIG. 4. Further, the STA identifier in the communication-resource-allocation message frame may be represented by "association identifier (AID)" in the TF-R in FIG. 4. Further, in the disclosure, "UL BW" in the TF-R in FIG. 5 may be added with bit(s) to characterize the channel bandwidth targeted by the communication-resource-allocation message frame.

In the disclosure, in order to identify that the TF-R after the format change is the communication-resource-allocation message frame including the communication-resource-allocation information bit, a multi-resource-unit-allocation identification bit may be set. The multi-resource-unit-allocation identification bit is configured to characterize that the communication-resource-allocation message frame includes the communication-resource-allocation information bit for identifying the at least one resource unit allocated to the STA. The multi-resource-unit-allocation identification bit may be set at the reserved bit of the TF-R. For example, the reserved bit "1" indicates that the TF-R is the communication-resource-allocation message frame including the communication-resource-allocation information bit.

In an example, a description is given by taking as an example allocating multiple RUs to one STA in the 20 MHz channel bandwidth. The communication-resource-allocation message frame generated when multiple RUs are allocated to the STA in the 20 MHz channel bandwidth may be that 20 MHz is set in the UL BW in FIG. 5, 1 is set in the reserved in FIG. 5 to identify the allocation of multiple RUs to the STA, and the RU type and the number of RUs for multiple allocation are identified by using 12 bits in "RU Allocation" in FIG. 4, in which the first three bits identify the RU type and the last 9 bits identify the number of RUs.

Further, in the disclosure, when multiple RUs are allocated to the STA, the number of allocated RUs may be determined based on the set channel bandwidth and the number of tones contained in the RU. For example, the number of allocated RUs is inversely proportional to the size of the set channel bandwidth and directly proportional to the number of tones contained in the RU. The set channel bandwidth may be 20 MHz, 40 MHz, 80 MHZ, 80+80/160 MHz or 160+160/320 MHz. Furthermore, in the disclosure, when multiple RUs are allocated to the STA, the multiple RUs allocated to the STA are allocated in a descending order according to the number of tones indicated by the RU type, so as to ensure that the interval among the allocated multiple RUs is minimized and the spectrum utilization is improved.

For example, the RU allocation for different channel bandwidths may be shown in Table 1 below:

TABLE 1

| | | |
|---|---|---|
| 20 MHz | M | (26-tone, 52-tone) |
| 40 MHz | n | (26-tone, 52-tone, 106-tone) |
| 80 MHz | b | (26-tone, 52-tone, 106-tone, 242-tone) |
| 80 + 80/160 MHz | v | (26-tone, 52-tone, 106-tone, 242-tone, 448-tone) |
| 160 + 160/320 MHz | c | (26-tone, 52-tone, 106-tone, 242-tone, 448-tone, 996-tone) |

In an example, allocation may be performed in the descending order according to the number of tones indicated by the RU type by using a set reference bandwidth as a minimum allocation unit. The reference bandwidth is set to 20 MHz. Of course, other bandwidths are also possible.

In the exemplary description, the 40 MHz bandwidth, with 20 MHz as the reference bandwidth, is specifically shown in Table 2 below:

TABLE 2

| Primary (20 MHz) | Secondary (20 MHz) |
|---|---|

The 80 MHz bandwidth, with 40 MHz as the reference bandwidth, is specifically shown in Table 3 below:

TABLE 3

| Primary (40 MHz) | Secondary (40 MHz) |
|---|---|

The 160 MHz bandwidth, with 80 MHz as the reference bandwidth, is specifically shown in Table 4 below:

TABLE 4

| Primary (80 MHz) | Secondary (80 MHz) |
|---|---|

In the disclosure, when the set reference bandwidth is used as the minimum allocation unit and the allocation may be performed in the descending order according to the number of tones indicated by the RU type, the maximum number of RUs capable to be allocated in the set reference bandwidth may be allocated.

For example, taking FIG. 2 as an example, in the 40 MHz channel bandwidth, there are two STAs associated with the AP, namely STA1 and STA2. The set reference bandwidth is 20 MHz. When the method for allocating the communication resource involved in the disclosure is used for communication-resource-allocation, if the communication resource required by STA1 is 242-tone RU, the leftmost 242-tone RU is allocated to STA1 first. Then the remaining resource allocation (with the largest RU combination) is allocated to STA2 according to the communication resource required by STA2. For example, in the disclosure, at most the remaining 242-tone RU, 26-tone RU, and 484-tone RU may be allocated to STA2 to avoid waste of spectrum resources and provide spectrum utilization.

In the disclosure, by generating the communication-resource-allocation message frame for identifying the at least one RU allocated to the STA in the set channel bandwidth and transmitting the communication-resource-allocation message frame, to allocate multiple RUs to the STA, sufficient communication resources may be allocated for the STA and the spectrum utilization rate may be improved.

Based on the same concept, embodiments of the disclosure also provide an apparatus for allocating a communication resource.

It may be understood that, in order to realize the above-mentioned functions, the apparatus for allocating the communication resource, provided in the embodiments of the disclosure, includes hardware structures and/or software modules corresponding to each function. In combination with the units and algorithm actions of the examples disclosed in the embodiments of the disclosure, the embodiments of the disclosure may be implemented in the form of hardware or a combination of hardware and computer software. It depends on specific applications and design constraints of the technical solutions to employ the hardware or the combination of hardware and computer software to implement a certain function. Those skilled in the art may use different methods to implement the described functions for each particular application, but this implementation should not be considered to exceed the scope of the technical solutions of the disclosure.

FIG. 6 is a block diagram illustrating an apparatus for allocating a communication resource, according to an embodiment. Referring to FIG. 6, the apparatus 100 includes a generating unit 101 and a transmitting unit 102.

The generating unit 101 is configured to generate a communication-resource-allocation message frame in a set channel bandwidth, the communication-resource-allocation message frame including a communication-resource-allocation information bit, the communication-resource-allocation information bit for identifying at least one RU allocated to an STA. The transmitting unit 102 is configured to transmit the communication-resource-allocation message frame.

In an embodiment, the communication-resource-allocation message frame further includes an STA identifier, and the STA identifier corresponds to the RU one-to-one.

In another embodiment, the communication-resource-allocation information bit is configured to identify, a RU type and a number of RUs, allocated to the STA.

In still another embodiment, the number of RUs is determined based on the set channel bandwidth and a number of tones in the RU.

In still another embodiment, the number of RUs is inversely proportional to a size of the set channel bandwidth and directly proportional to the number of tones in the RU.

In still another embodiment, the communication-resource-allocation information bit includes a first bit for indicating the RU type and a second bit for indicating the number of RUs.

In still another embodiment, a number of bits of the first bit is determined based on a total number of RU types, and different bit values of the first bit are configured to indicate different RU types.

In still another embodiment, a number of bits of the second bit is determined based on the RU type and a maximum number of resource units capable to be allocated in each channel bandwidth, the number of bits of the second bit is configured to indicate the RU type, and a bit value of the second bit is configured to indicate a channel bandwidth and a number of resource units allocated in the channel bandwidth and for the RU type indicated by the number of bits of the second bit.

In still another embodiment, a number of bits for indicating the number of RUs is capable to characterize a sum of a largest number of RUs capable to be allocated for the RU type in each channel bandwidth.

In still another embodiment, the communication-resource-allocation message frame further includes a multi-resource-unit-allocation identification bit, and the multi-resource-unit-allocation identification bit is configured to characterize that the communication-resource-allocation message frame includes the communication-resource-allocation information bit for identifying the at least one RU allocated to the STA.

In still another embodiment, the at least one RU allocated to the STA is allocated in a descending order according to a number of tones indicated by the RU type.

In still another embodiment, allocation in the descending order according to the number of tones indicated by the RU type includes: allocation in the descending order according to the number of tones indicated by the RU type by using a set reference bandwidth as a minimum allocation unit.

In still another embodiment, the set reference bandwidth includes 20 MHz.

In still another embodiment, the set channel bandwidth includes 20 MHz, 40 MHz, 80 MHZ, 80+80/160 MHz or 160+160/320 MHz.

With respect to the apparatuses in the above embodiments, the specific manners for performing operations for individual modules therein have been described in detail in the embodiments regarding the methods, which will not be elaborated herein.

Figure 7:
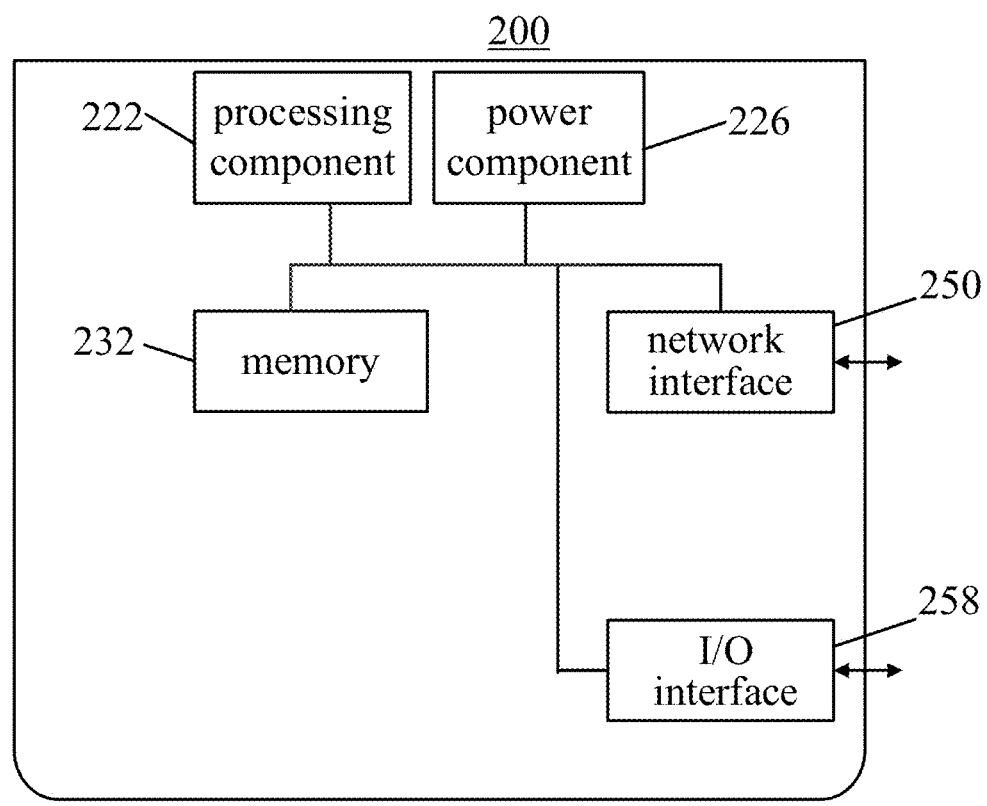
FIG. 7 is a block diagram illustrating a device for allocating a communication resource, according to an embodiment.

FIG. 7 is a block diagram illustrating a device 200 for allocating a communication resource, according to an embodiment. For example, the device 200 may be provided as a server. Referring to FIG. 2, the device 200 includes a processing component 222, which further includes one or more processors, and a memory resource represented by a memory 232 for storing instructions that may be executed by the processing component 222, such as application programs. The application program stored in the memory 232 may include one or more modules each corresponding to a set of instructions. In addition, the processing component 222 is configured to execute instructions to perform the above method.

The device 200 may also include a power component 226 configured to perform power management of the device 200, a wired or wireless network interface 250 configured to connect the device 200 to the network, and an input output (I/O) interface 258. The device 200 may operate based on an operating system stored in the memory 232, such as Windows Server™, Mac OS X™, Unix™, Linux™, FreeBSD™ or the like.

In an embodiment, there is also provided a non-transitory computer-readable storage medium including instructions, such as the memory 232 including instructions. The instructions may be executed by the processor of the device 200 to complete the foregoing method. For example, the non-transitory computer-readable storage medium may be read only memory (ROM), random access memory (RAM), compact disc read only memory (CD-ROM), magnetic tape, floppy disk, optical data storage device, etc.

The technical solutions provided by embodiments of the disclosure may include the following beneficial effects. By generating the communication-resource-allocation message frame for identifying the at least one RU allocated to the STA in the set channel bandwidth and transmitting the communication-resource-allocation message frame, sufficient communication resources may be allocated for the STA and the spectrum utilization rate may be improved.

It should be understood that "plurality" or "multiple" mentioned in the disclosure may refer to one or more, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It may be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the disclosure, the first information may also be referred to as second information, and similarly, the second information may also be referred to as first information.

It may be further understood that although operations in the embodiments of the disclosure are described in a specific order in the drawings, they should not be understood as requiring these operations to be performed in the specific order shown or in a serial order, or requiring to perform all the operations shown to obtain the desired result. In certain circumstances, multitasking and parallel processing may be advantageous.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for allocating a communication resource, comprising:

generating a communication-resource-allocation message frame in a set channel bandwidth, the communication-resource-allocation message frame comprising communication-resource-allocation information bits, the communication-resource-allocation information bits for identifying at least one resource unit allocated to a station; and transmitting the communication-resource-allocation message frame;

wherein the communication-resource-allocation information bits are configured to identify a resource unit type and a number of resource units allocated to the station, wherein the communication-resource-allocation information bits comprise first bits for indicating the resource unit type and second bits for indicating the number of resource units, wherein a number of second bits is determined based on the resource unit type and a maximum number of resource units capable to be allocated in each channel bandwidth, the number of second bits is configured to indicate the resource unit type, and a bit value of the second bits is configured to indicate a channel bandwidth and a number of resource units allocated in the channel bandwidth and for the resource unit type indicated by the number of second bits.

2. The method as claimed in claim 1, wherein the communication-resource-allocation message frame further comprises a station identifier, and the station identifier corresponds to the resource unit one-to-one.

3. The method as claimed in claim 1, wherein the number of resource units is determined based on the set channel bandwidth and a number of tones in a resource unit.

4. The method as claimed in claim 3, wherein the number of resource units is inversely proportional to a size of the set channel bandwidth and directly proportional to the number of tones in the resource unit.

5. The method as claimed in claim 1, wherein a number of first bits is determined based on a total number of resource unit types, and different bit values of the first bits are configured to indicate different resource unit types.

6. The method as claimed in claim 1, wherein the number of second bits for indicating the number of resource units indicates a sum of a largest number of resource units capable to be allocated for the resource unit type in each channel bandwidth.

7. The method as claimed in claim 1, wherein the communication-resource-allocation message frame further comprises a multi-resource-unit-allocation identification bit, and the multi-resource-unit-allocation identification bit indicates that the communication-resource-allocation message frame comprises the communication-resource-allocation information bits for identifying the at least one resource unit allocated to the station.

8. The method as claimed in claim 1, wherein the at least one resource unit allocated to the station is allocated in a descending order according to a number of tones indicated by a resource unit type.

9. The method as claimed in claim 8, wherein allocation in the descending order according to the number of tones indicated by the resource unit type comprises:
allocation in the descending order according to the number of tones indicated by the resource unit type by using a set reference bandwidth as a minimum allocation unit.

10. The method as claimed in claim 9, wherein the set reference bandwidth comprises 20 MHz.

11. The method as claimed in claim 1, wherein the set channel bandwidth comprises 20 MHz, 40 MHz, 80 MHZ, 80+80/160 MHz or 160+160/320 MHz.

12. A device for allocating a communication resource, comprising:
a processor; and
a memory for storing instructions executable by the processor;
wherein the processor is configured to:
generate a communication-resource-allocation message frame in a set channel bandwidth, the communication-resource-allocation message frame comprising communication-resource-allocation information bits, the communication-resource-allocation information bits for identifying at least one resource unit allocated to a station; and
transmit the communication-resource-allocation message frame;
wherein the communication-resource-allocation information bits are configured to identify a resource unit type and a number of resource units allocated to the station,
wherein the communication-resource-allocation information bit comprises first bits for indicating the resource unit type and second bits for indicating the number of resource units,
wherein a number of second bits is determined based on the resource unit type and a maximum number of resource units capable to be allocated in each channel bandwidth, the number of second bits is configured to indicate the resource unit type, and a bit value of the second bits is configured to indicate a channel bandwidth and a number of resource units allocated in the channel bandwidth and for the resource unit type indicated by the number of second bits.

13. The device as claimed in claim 12, wherein the communication-resource-allocation message frame further comprises a station identifier, and the station identifier corresponds to the resource unit one-to-one.

14. The device as claimed in claim 12, wherein the communication-resource-allocation message frame further comprises a multi-resource-unit-allocation identification bit, and the multi-resource-unit-allocation identification bit indicates that the communication-resource-allocation message frame comprises the communication-resource-allocation information bits for identifying the at least one resource unit allocated to the station.

15. A non-transitory computer-readable storage medium therein instructions that, when executed by a processor of an access point, causes the access point to perform:
generating a communication-resource-allocation message frame in a set channel bandwidth, the communication-resource-allocation message frame comprising communication-resource-allocation information bits, the communication-resource-allocation information bits for identifying at least one resource unit allocated to a station; and
transmitting the communication-resource-allocation message frame;
wherein the communication-resource-allocation information bits are configured to identify a resource unit type and a number of resource units allocated to the station,
wherein the communication-resource-allocation information bit comprises first bits for indicating the resource unit type and second bits for indicating the number of resource units,
wherein a number of second bits is determined based on the resource unit type and a maximum number of resource units capable to be allocated in each channel bandwidth, the number of second bits is configured to indicate the resource unit type, and a bit value of the second bits is configured to indicate a channel bandwidth and a number of resource units allocated in the channel bandwidth and for the resource unit type indicated by the number of second bits.

* * * * *